United States Patent
Chen et al.

(10) Patent No.: US 11,348,743 B2
(45) Date of Patent: May 31, 2022

(54) AUTOMATIC BALANCE APPARATUS WITH DOUBLE-MOVING-CONTACT SPRING LEAF

(71) Applicant: JIANGSU BAREP INTELLIGENCE TECHNOLOGY CO., LTD., Jiangsu (CN)

(72) Inventors: Jiangang Chen, Jiangsu (CN); Xiaobo Zheng, Jiangsu (CN); Feng Zhao, Jiangsu (CN)

(73) Assignee: JIANGSU BAREP INTELLIGENCE TECHNOLOGY CO., LTD., Zhangjiagang (CN)

( * ) Notice: Subject to any disclaimer, the term of this patent is extended or adjusted under 35 U.S.C. 154(b) by 58 days.

(21) Appl. No.: 17/000,819

(22) Filed: Aug. 24, 2020

(65) Prior Publication Data

US 2021/0313123 A1    Oct. 7, 2021

(30) Foreign Application Priority Data

Apr. 7, 2020 (CN) .......................... 202020488221.9

(51) Int. Cl.
*H01H 1/36* (2006.01)
*H01H 3/38* (2006.01)
*H02H 3/16* (2006.01)

(52) U.S. Cl.
CPC ................ *H01H 1/36* (2013.01); *H01H 3/38* (2013.01); *H02H 3/16* (2013.01)

(58) Field of Classification Search
CPC ............ H01H 1/36; H01H 3/38; H01H 1/027; H02H 3/16
USPC .............................................. 200/252; 361/45
See application file for complete search history.

(56) References Cited

U.S. PATENT DOCUMENTS

2011/0222195 A1\* 9/2011 Benoit .................... H04L 69/40
361/45

\* cited by examiner

*Primary Examiner* — Edwin A. Leon
*Assistant Examiner* — Iman Malakooti
(74) *Attorney, Agent, or Firm* — Gary J. Gershik

(57) ABSTRACT

The utility model discloses an automatic balance apparatus with a double-moving-contact spring leaf in a socket, which may ensure that two moving contacts are in good contact with corresponding stationary contacts. The automatic balance apparatus includes a lifting slide block, where the lifting slide block is provided with a lifting base below the spring leaf, a balance warped plate corresponding to an arrangement direction of moving contacts is movably disposed in the lifting base, and upward protruding portions are respectively disposed on two sides of the top surface of the balance warped plate. The utility model is particularly applicable to various ground fault circuit interrupters (GFCIs) and arc fault circuit interrupters (AFCIs).

14 Claims, 3 Drawing Sheets

AUTOMATIC BALANCE APPARATUS WITH DOUBLE-MOVING-CONTACT SPRING LEAF

RELATED APPLICATIONS

This application claims priority of Chinese Application No. 202020488221.9 filed Apr. 7, 2020, the contents of each of which are hereby incorporated by reference into this application.

BACKGROUND

Technical Field

The utility model relates to a socket, and in particular, to an automatic balance apparatus with a double-moving-contact spring leaf in a socket.

Related Art

Currently, in a conventional ground fault circuit interrupter (GFCI) and an arc fault circuit interrupter (AFCI), a lifting device of a spring leaf has a simple structure and generally includes a lifting slide block. The lifting slide block is provided with a lifting arm corresponding to the spring leaf, and the lifting arm is provided with a protruding portion corresponding to a corresponding moving contact. In an actual use process, the lifting arm cannot ensure that two moving contacts are in good contact with corresponding stationary contacts in the lifting process, that is, one of the contacts may have poor contact. Consequently, reliable connections between the moving contacts and the stationary contacts cannot be ensured, greatly shortening the service life of the moving contacts and the stationary contacts.

SUMMARY

The technical problem to be solved in the utility model is to provide an automatic balance apparatus with a double-moving-contact spring leaf in a socket which may ensure that two moving contacts are in good contact with corresponding stationary contacts.

To resolve the above technical problem, a technical solution used in the utility model is as follows: an automatic balance apparatus with a double-moving-contact spring leaf in a socket is provided, the automatic balance apparatus including a lifting slide block, where the lifting slide block is provided with a lifting base below the spring leaf, a balance warped plate corresponding to an arrangement direction of moving contacts is movably disposed in the lifting base, and upward protruding portions are respectively disposed on two sides of the top surface of the balance warped plate.

As a preferred solution, in the automatic balance apparatus with the double-moving-contact spring leaf, the balance warped plate is specifically disposed as follows: a mounting chamber matching the balance warped plate is upwards disposed in the lifting base, the bottom of the mounting chamber is provided with a rotary support shaft and a pair of mounting holes located on two sides of the rotary support shaft, the bottom of the balance warped plate is provided with a clamping rotary shaft hole that matches the rotary support shaft and has a downward opening, a circumference of the clamping rotary shaft hole exceeds half a circle, the balance warped plate is disposed in the mounting chamber, the rotary support shaft is located in the clamping rotary shaft hole at the bottom of the balance warped plate, and side walls of two sides of the clamping rotary shaft hole respectively pass out of the corresponding mounting holes on the two sides of the rotary support shaft.

As a preferred solution, in the automatic balance apparatus with the double-moving-contact spring leaf, guide chamfers are respectively disposed on two sides of an edge of the clamping rotary shaft hole.

As a preferred solution, in the automatic balance apparatus with the double-moving-contact spring leaf, the spring leaf is provided with, at one end where the moving contacts are disposed, a separation groove along a longitudinal direction to form two moving contact arms capable of swinging independently, and the pair of moving contacts are respectively disposed on the corresponding moving contact arms.

As a preferred solution, in the automatic balance apparatus with the double-moving-contact spring leaf, the separation groove is centrally disposed at one end of the spring leaf.

As a preferred solution, in the automatic balance apparatus with the double-moving-contact spring leaf, the socket is a GFCI or an AFCI.

The utility model has the following beneficial effects: in the utility model, a balance warped plate is disposed, so that a spring leaf may be automatically leveled in the use process to ensure that two moving contacts are in good contact with corresponding stationary contacts, ensuring reliable connections between the moving contacts and the stationary contacts, and greatly prolonging the service life of the moving contacts and the stationary contacts.

Figure 1:
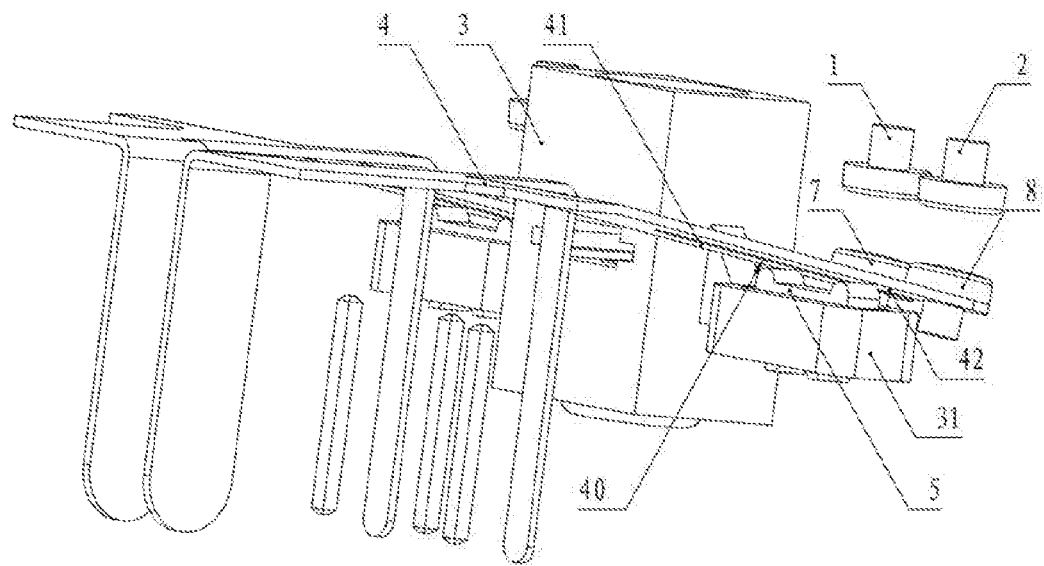
FIG. 1 is a schematic structural diagram of an automatic balance apparatus according to the utility model.

List of Reference Numerals in FIG. 1 to FIG. 5: 1. First stationary contact. 2. Second stationary contact, 3. Lifting slide block, 31. Lifting base, 311. Bottom wall, 312. Rotary support shaft, 313. Mounting hole, 4. Spring leaf, 40. Separation groove, 41. First moving contact arm, 42. Second moving contact arm, 5. Balance warped plate, 51. First protruding portion, 52. Second protruding portion, 53. Clamping rotary shaft hole, 531. Guide inclined plane, 532. Side wall, 7. First moving contact, 8. Second moving contact.

DETAILED DESCRIPTION

A specific embodiment of an automatic balance apparatus with a double-moving-contact spring leaf in a socket according to the utility model is described in detail below with reference to the accompanying drawings.

Figure 2:
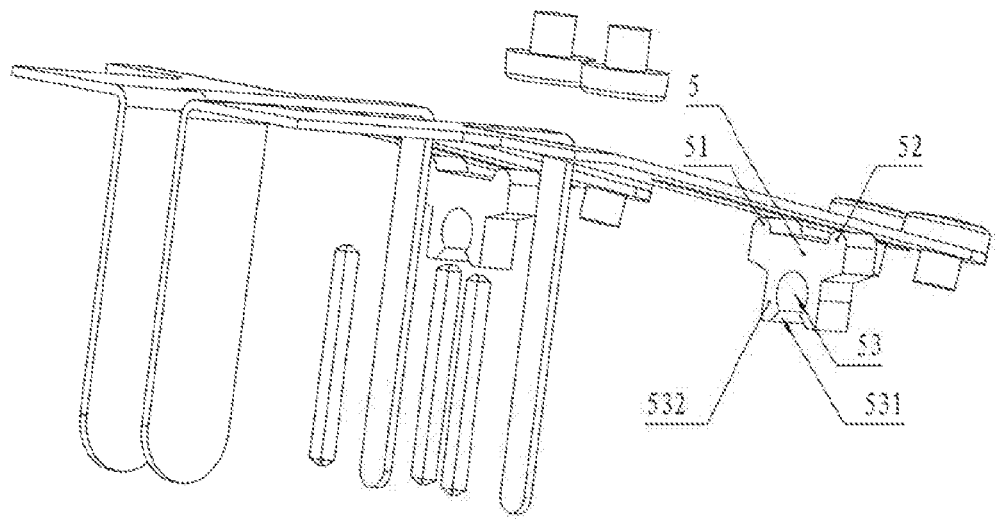
FIG. 2 is a schematic local structural diagram of FIG. 1.
Figure 3:
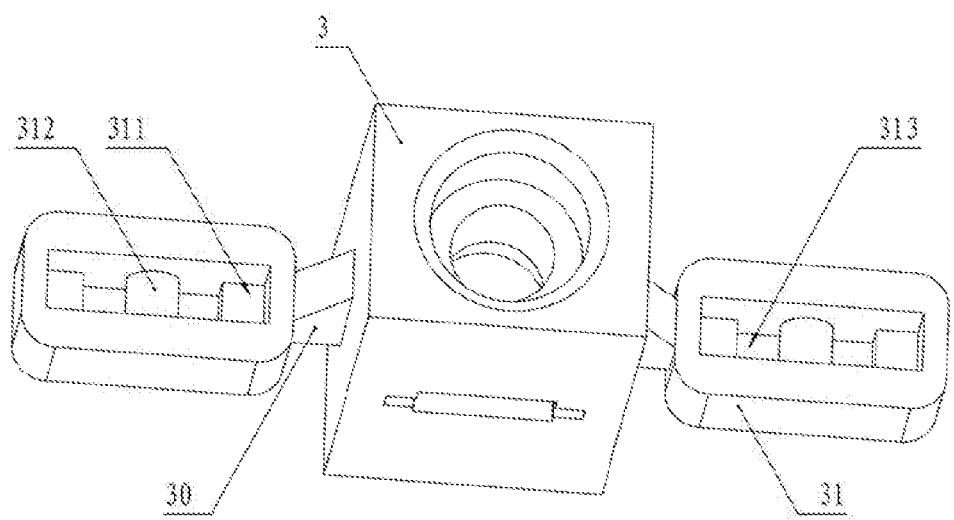
FIG. 3 is a schematic enlarged structural diagram of a visual angle of a lifting slide block.
Figure 4:
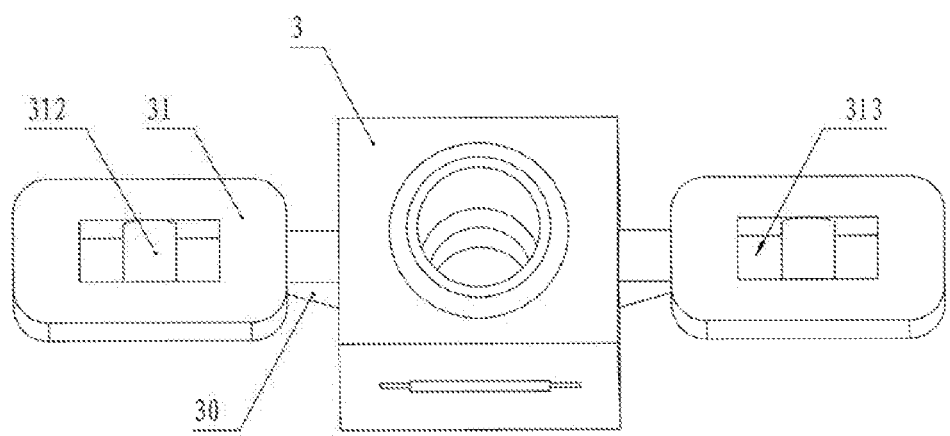
FIG. 4 is a schematic enlarged structural diagram of another visual angle of a lifting slide block.

As shown in FIG. 1 and FIG. 2, in an automatic balance apparatus with a double-moving-contact spring leaf in a socket according to the utility model, the structure thereof includes: a lifting slide block 3, where the lifting slide block 3 is provided with a lifting base 31 below the spring leaf 4, a balance warped plate 5 corresponding to an arrangement direction of a first moving contact 7 and a second moving contact 8 is movably disposed in the lifting base 31, and a first protruding portion 51 and a second protruding portion 52 that protrude upwards are respectively disposed on two sides of the top surface of the balance warped plate 5. The balance warped plate 5 is specifically disposed as follows: as shown in FIG. 3 and FIG. 4, a mounting chamber matching the balance warped plate 5 is upwards disposed in the lifting base 31, the middle of a bottom wall 311 of the mounting chamber is provided with a rotary support shaft 312 and a pair of mounting holes 313 located on two sides of the rotary support shaft 312, the bottom of the balance warped plate 5 is provided with a clamping rotary shaft hole 53 that matches the rotary support shaft 312 and has a downward opening, a circumference of the clamping rotary shaft hole 53 exceeds half a circle, guide chamfers 531 for facilitating leading-in of the rotary support shaft 312 are disposed respectively on two sides of an edge of the clamping rotary shaft hole 53, the balance warped plate 5 is disposed in the mounting chamber, the rotary support shaft 312 is located in the clamping rotary shaft hole 53 at the bottom of the balance warped plate 5, side walls 532 of two sides of the clamping rotary shaft hole 53 respectively pass out of the corresponding mounting holes 313 on the two sides of the rotary support shaft 312, and the bottom wall 311 on the two sides of the rotary support shaft 312 forms a limiting laying surface of the balance warped plate 5. In this embodiment, the spring leaf 4 is centrally provided with, at one end where the first moving contact 7 and the second moving contact 8 are disposed, a separation groove 40 along a longitudinal direction to form a first moving contact arm 41 and a second moving contact arm 42 capable of swinging independently, the first moving contact 7 is disposed on the first moving contact arm 41, and the second moving contact 8 is disposed on the second moving contact arm 42.

Figure 5:
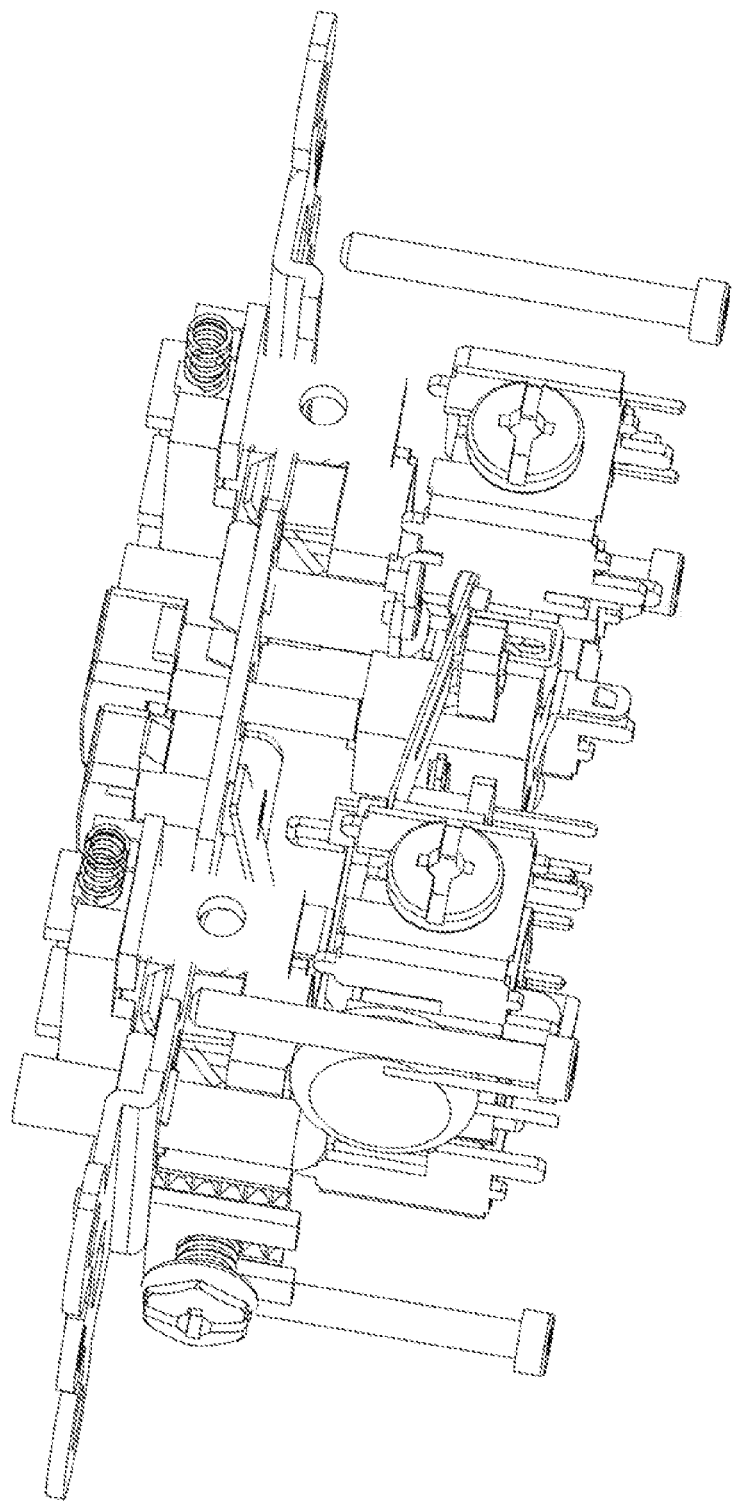
FIG. 5 is a schematic local structural diagram of a GFCI provided with the automatic balance apparatus according to the utility model.

In an actual application, the automatic balance apparatus with the double-moving-contact spring leaf according to the utility model is mainly applied to an AFCI and a GFCI that is shown in FIG. 5.

In actual use, under action of the balance warped plate 5, the spring leaf 4 may be automatically leveled, so that the first moving contact 7 on the first moving contact arm 41 is in good contact with a first stationary contact 1 and the second moving contact 8 on the second moving contact arm 42 is in good contact with a second stationary contact 2, making connections between the moving contacts and the stationary contacts more reliable.

The foregoing descriptions are merely preferred embodiments of the utility model, but are not intended to limit the scope of implementation of the utility model. Any equivalent changes or modifications made based on the shape, construction, feature, and spirit in the scope of the claims of the utility model shall be included in the scope of the claims of the utility model.

What is claimed is:

1. An automatic balance apparatus with a double-moving-contact spring leaf in a socket, comprising: a lifting slide block, wherein the lifting slide block is provided with a lifting base below the spring leaf, a balance warped plate corresponding to an arrangement direction of moving contacts is movably disposed in the lifting base, and upward protruding portions are respectively disposed on two sides of the top surface of the balance warped plate, wherein the balance warped plate is specifically disposed as follows: a mounting chamber matching the balance warped plate is upwards disposed in the lifting base, the bottom of the mounting chamber is provided with a rotary support shaft and a pair of mounting holes located on two sides of the rotary support shaft, the bottom of the balance warped plate is provided with a clamping rotary shaft hole that matches the rotary support shaft and has a downward opening, a circumference of the clamping rotary shaft hole exceeds half a circle, the balance warped plate is disposed in the mounting chamber, the rotary support shaft is located in the clamping rotary shaft hole at the bottom of the balance warped plate, and side walls of two sides of the clamping rotary shaft hole respectively pass out of the corresponding mounting holes on the two sides of the rotary support shaft.

2. The automatic balance apparatus with the double-moving-contact spring leaf according to claim 1, wherein guide chamfers are respectively disposed on two sides of the edge of the clamping rotary shaft hole.

3. The automatic balance apparatus with the double-moving-contact spring leaf according to claim 1, wherein the spring leaf is provided with, at one end where the moving contacts are disposed, a separation groove along a longitudinal direction to form two moving contact arms capable of swinging independently, and the pair of moving contacts are respectively disposed on the corresponding moving contact arms.

4. The automatic balance apparatus with the double-moving-contact spring leaf according to claim 3, wherein the separation groove is centrally disposed at one end of the spring leaf.

5. The automatic balance apparatus with the double-moving-contact spring leaf according to claim 1, wherein the socket is a ground fault circuit interrupter (GFCI).

6. The automatic balance apparatus with the double-moving-contact spring leaf according to claim 1, wherein the socket is an arc fault circuit interrupter (AFCI).

7. The automatic balance apparatus with the double-moving-contact spring leaf according to claim 1, wherein the socket is a ground fault circuit interrupter (GFCI).

8. The automatic balance apparatus with the double-moving-contact spring leaf according to claim 2, wherein the socket is a ground fault circuit interrupter (GFCI).

9. The automatic balance apparatus with the double-moving-contact spring leaf according to claim 3, wherein the socket is a ground fault circuit interrupter (GFCI).

10. The automatic balance apparatus with the double-moving-contact spring leaf according to claim 4, wherein the socket is a ground fault circuit interrupter (GFCI).

11. The automatic balance apparatus with the double-moving-contact spring leaf according to claim 1, wherein the socket is an arc fault circuit interrupter (AFCI).

12. The automatic balance apparatus with the double-moving-contact spring leaf according to claim 2, wherein the socket is an arc fault circuit interrupter (AFCI).

13. The automatic balance apparatus with the double-moving-contact spring leaf according to claim 3, wherein the socket is an arc fault circuit interrupter (AFCI).

14. The automatic balance apparatus with the double-moving-contact spring leaf according to claim 4, wherein the socket is an arc fault circuit interrupter (AFCI).

* * * * *